United States Patent Office 3,264,258
Patented August 2, 1966

3,264,258
VULCANISABLE ORGANOPOLYSILOXANE COMPOSITIONS AND VULCANISED PRODUCTS OBTAINED THEREFROM
Louis Ceyzeriat, Lyon, France, assignor to Rhone-Poulenc S.A., Paris, France, a corporation of France
No Drawing. Filed Dec. 6, 1962, Ser. No. 242,623
Claims priority, application France, Dec. 7, 1961, 881,278
7 Claims. (Cl. 260—46.5)

This invention relates to vulcanisable organopolysiloxane compositions and vulcanised products obtained therefrom.

My United States Patent No. 3,133,891 describes liquid or viscous organopoly siloxane compositions which are stable in the absence of moisture but which are directly converted in the presence of water in liquid or vapour form into solid elastic masses.

These compositioins comprise essentially a diorganopolysiloxane containing at least 0.1% of hydroxyl radicals, constituted by units of the formula $R_2SiO$, in which R represents a hydrocarbon radical: 0.5 to 25% of organotriacyloxysilane (calculated on the weight of polysiloxane) and, if desired, a catalyst, one or more fillers and/or a solvent.

These products have the advantage of not requiring the addition of a hardening agent when they are being used and of vulcanising readily at slightly raised temperature. They have been used for many purposes, more particularly in the spheres of moulding, adhesion, coating (particularly glass fabrics) and sealing. The elastomers thus obtained are completely satisfactory when used at slightly raised temperatures, whatever may be the surrounding atmosphere, and even at high temperatures in the region of 250° C. when in the open air.

On the other hand, it is found that in a confined atmosphere the rubber-like products, e.g. coatings, become softened and tacky at high temperatures and even reach a pasty state under extreme conditions. An atmosphere in contact with the organopolysiloxane coating is considered to be a confined atmosphere when there is no ventilation of the coating or practically none.

This change of physical state is accompanied by a lowering of the mechanical properties of the elastomer and limits the use of the vulcanisable compositions of this type.

The present invention is concerned with new organopolysiloxane compositions which vulcanise at slightly raised temperature, like those which have been referred to above, but which give elastomers which have good resistance to high temperature in a confined atmosphere.

This desirable result is obtained by having present in the compositions of the above type a proportion of an organic peroxide. 0.5 to 10% of the peroxide is a suitable proportion. The compositions are prepared in the substantial absence of moisture. Such compositions containing an organic peroxide may be exposed to moisture and then heated at temperatures between 100° and 250° to give elastomers having a much improved heat stability in confined atmospheres.

The improvement in the resistance to heat of the elastomers due to the addition of organic peroxide is particularly noticeable at temperatures higher than 200°, maintained for periods of time from several hours to several days. It is particularly apparent in connection with the hardness and the breaking resistance, which are several times higher than those of elastomers originating from compositions to which peroxide is not added.

The vulcanisable compositions of the present invention are accordingly moisture-free compositions comprising a linear disorganopolysiloxane consisting of units of the formula $R_2SiO$ in which each R represents a monovalent aliphatic, alicyclic or aromatic hydrocarbon radical or halogenated derivative of such a hydrocarbon radical and containing at least 0.1% by weight of hydroxyl groups together with an organotriacyloxysilane of the formula $R'Si(OCOR'')_3$ in which R' represents a monovalent alkyl, alkenyl, aryl or aralkyl hydrocarbon radical and R'' represents a monovalent alkyl radical (preferably of 1–18 carbon atoms) or a monovalent aryl radical and also comprising an organic peroxide. The peroxide may be added to the reaction product of the linear diorganopolysiloxane and the organotriacyloxysilane.

In the above formulae R may for example be methyl, ethyl, vinyl, alkyl (i.e. a lower alkyl or alkenyl radical), cyclohexyl, phenyl or butyl. Similarly R' may be the same or a different lower alkyl or alkenyl radical or aryl radical or may be an aralkyl radical, e.g. benzyl. Especially useful diorganopolysiloxanes are the dimethylpolysiloxanes, the methyl-phenyl polysiloxanes and the methyl-vinyl polysiloxanes. The diorganopolysiloxane may have a viscosity at 25° C. of 5,000–500,000 centistokes, a preferable range being 20,000–100,000 centistokes. Methods of preparing such linear polysiloxanes are described in the prior specification referred to above. The organotriacyloxysilane is preferably used in a weight proportion of 0.5% to 25%, and especially 2 to 5%, based on the diorganopolysiloxane.

The compositions may also contain mineral fillers to modify their consistency or to reinforce the vulcanised products, solvents and/or catalysts.

As mineral fillers there may be mentioned the various kinds of silica on the market, oxides of iron, alumina and carbonates especially calcium carbonate. The particular filler and the proportion in which it is used will be appropriate to the particular use to which the composition is to be applied. Silicas obtained by precipitation, for example those sold under the trade names Santocel and Hi-Sil and silicas obtained by combustion, for example those sold under the trade name Aerosil, are particularly suitable for the production of reinforced elastomeric products. They have a large absorbent surface and are very effective even in small quantities. Fillers such as milled natural silicas and calcium carbonate can, on the other hand, be employed in larger proportions, for example 200% on the weight of the diorganopolysiloxane.

The compositions, whether containing fillers or not, may be diluted with an organic liquid which is compatible with the diorganopolysiloxane, for example white spirit or an aromatic hydrocarbon, for instance benzene, toluene or xylene.

Typical organic peroxides which may be used include benzoyl peroxide, 2,4-dichloro-benzoyl peroxide, dicumyl peroxide or t-butylperbenzoate.

The vulcanisable compositions containing the peroxide may be obtained under the same conditions as those described in the specification referred to above, i.e. in anhydrous medium, starting with constituents freed from any trace of water. The products thereby obtained should be stored in the absence of humidity and can thus be kept for several months.

Among the applications, for which these compositions are particularly suitable, may be mentioned the formation of furnace door joints, the insulation of electric conductors, the linings of culinary utensils, the hardness and insensitivity of which to foods may be maintained after repeated heating to high temperature, etc. They are also applicable to the sealing of containers such as tanks, sheaths, pipe conduits and the like.

The invention includes not only the vulcanisable compositions themselves but also the elastomers obtained on vulcanisation, either by the action of water alone or by the combined action of water and heat-initiated peroxide.

The following examples illustrate the invention:

Example I 50 parts of dimethylpolysiloxane oil (viscosity at 25° =21,000 centistokes) are placed in an apparatus equipped with a stirrer device and the atmosphere of which has been flushed with dry nitrogen the said oil having been prepared as indicated in Example I(a) of U.S. application S. No. 110,648, now U.S. Patent 3,133,891. After having started the stirrer mechanism, 5 parts of silica obtained by combustion and 25 parts of diatomaceous earth are added. The stirring is continued for one and a half hours in order to homogenise the mass and then another 50 parts of the silicone oil are added and the mixture is heated for 2 hours at 135–145° under a current of dry nitrogen to promote the elimination of any moisture introduced by the charges. The product is then allowed to cool, whereafter 4 parts of methyltriacetoxysilane are added, followed by 3 parts of 2,4-dichloro-benzoyl peroxide in a 50% dispersion in a silicone oil. This paste is transferred while protected from moisture into aluminium tubes.

One part of the product is spread by means of a casting device on a glass sheet coated beforehand with "Teepol" (an aqueous solution of a sodium salt of a sulphated secondary alcohol) as an anti-adhesion agent, and then exposed to the ambient air. After 8 hours' exposure to the air, a solid, elastic film (A) with a thickness of 1.4 mm. is obtained. This film is then heated in an oven for one hour at 150° and 2 hours at 250° to cause the peroxide to react. After cooling, the mechanical properties of the film (A) thus obtained are measured with the following results:

Shore hardness A=43
Tensile strength=18 kg./cm.$^2$
Elongation=150%

By way of comparison, a composition similar to the foregoing is prepared, but without the addition of peroxide. One part is kept in tubes protected from moisture and another part is used to make a film (B), operating in the same way as for (A).

The mechanical properties of the film (B) thus obtained are as follows:

Shore hardness A=32
Tensile strength=28.5 kg./cm.$^2$
Elongation=370%

The two film samples (A) and (B) are subjected to the following heat resistance test:

They are placed in glass ampoules which are sealed and then placed in an oven at 150° for 24 hours. After cooling, it is found that the sample (A) remained firm and non-tacky, whereas the sample (B) became tacky and highly extensible.

The mechanical properties of the two products are then as follows:

| Samples | Shore Hardness A | Tensile strength (kg./cm.$^2$) | Elongation, percent |
|---|---|---|---|
| (A) | 28 | 10.5 | 150 |
| (B) | 4 | 3 | 750 |

It is found that while sample (A) has retained the properties of an elastomer, sample (B) has changed into a highly extensible product.

After the tubes have been kept for several months, fresh tests were carried out on films (A') and (B'). It is found that the compositions have kept well and behave in the same way as the fresh compositions when preparing films. After the heat resistance test in a confined atmosphere, there are found on the films (A') and (B') the same differences as on the films (A) and (B).

Example II

A paste similar to that described in the preceding example is prepared, but replacing the 2,4-dichloro-benzoyl peroxide by dicumyl peroxide at the rate of 8.7 parts per 100 parts of dimethylpolysiloxane oil.

The paste obtained is diluted with cyclohexane at the rate of one part of diluent to three parts of vulcanisable composition; a product (A) is obtained.

A dilution of equal concentration is also prepared, but using a composition which does not contain peroxide (product B).

From these products (A) and (B), films are formed which are left exposed to the ambient air. After 12 hours, the films obtained are heated for one hour at 150° and then for 2 hours at 250°.

After cooling, the Shore hardness A values are as follows:

Product (A)=33
Product (B)=31.

The samples (A) and (B) are then placed in ampoules, which are sealed and heated for 48 hours at 250°.

It is found that product (A) has maintained its shape, its Shore hardness being 20, while the product (B) has changed into a paste.

I claim:
1. A vulcanisable, moisture-free liquid composition comprising a linear hydroxy-terminated diorganopolysiloxane cross-linked both by an organic peroxide and by an organotriacyloxysilane.
2. A composition as claimed in claim 1 wherein the diorganopolysiloxane is of the formula $R_2SiO$ in which R is a monovalent aliphatic, alicyclic or aromatic hydrocarbon radical or a halogenated derivative thereof.
3. A vulcanisable moisture-free liquid composition comprising a linear, hydroxy-terminated diorganopolysiloxane of the formula $R_2SiO$, in which R is a monovalent aliphatic, alicyclic or aromatic hydrocarbon radical or a halogenated derivative thereof, and having a viscosity at 25° C. of 5,000 to 500,000 centistokes, crosslinked by 0.5 to 10% of an organic peroxide and 0.5 to 25% of an organotriacyloxysilane, said percentages being by weight of the diorganopolysiloxane.
4. A heat-resistant elastomeric solid obtained by the action of water and heat on a composition as claimed in claim 3.
5. A composition according to claim 3 wherein the organotriacyloxysilane is of the formula $R'Si(OCOR'')_3$ in which R' is monovalent alkyl, alkenyl, aryl or aralkyl hydrocarbon radical and R'' is a monovalent alkyl radical of 1 to 18 carbon atoms or a monovalent aryl radical and wherein the diorganopolysiloxane is of the formula $R_2SiO$ in which R represents a methyl, vinyl or phenyl radical, and has a viscosity at 25° C. between 20,000 and 100,000.

6. A composition as claimed in claim 5 comprising also a mineral filler.

7. A composition as claimed in claim 5 comprising also as a diluent an organic liquid compatible with the diorganopolysiloxane.

References Cited by the Examiner

UNITED STATES PATENTS

| | | | |
|---|---|---|---|
| 2,707,179 | 4/1955 | Peyrot et al. | 260—46.5 |
| 2,816,089 | 12/1957 | Willis | 260—46.5 |
| 3,035,016 | 5/1962 | Bruner | 260—46.5 |
| 3,036,985 | 5/1962 | Daudt | 260—46.5 |
| 3,061,575 | 10/1962 | Russell | 260—46.5 |
| 3,077,465 | 2/1963 | Bruner | 260—448.8 |
| 3,105,061 | 9/1963 | Bruner | 260—46.5 |
| 3,127,363 | 5/1964 | Nitzsche et al. | 260—46.5 |
| 3,133,891 | 5/1964 | Ceyzeriat | 260—46.5 |

FOREIGN PATENTS 862,576  3/1961  Great Britain.

LEON J. BERCOVITZ, *Primary Examiner.*

M. I. MARQUIS, *Assistant Examiner.*